United States Patent [19]
Yang

[11] Patent Number: 5,936,697
[45] Date of Patent: Aug. 10, 1999

[54] SELF-COMPENSATED TWISTED NEMATIC MODE FOR REFLECTIVE LIGHT VALVES

[75] Inventor: Kei-Hsiung Yang, Katonah, N.Y.

[73] Assignee: International Business Machines Corporation, Armonk, N.Y.

[21] Appl. No.: 08/659,813

[22] Filed: Jun. 7, 1996

[51] Int. Cl.[6] .................................................. G02F 1/13
[52] U.S. Cl. ........................................ 349/180; 349/113
[58] Field of Search .................................... 349/180, 181, 349/113

[56] References Cited

U.S. PATENT DOCUMENTS

| | | |
|---|---|---|
| 4,378,955 | 4/1983 | Bleha et al. . |
| 4,896,947 | 1/1990 | Leenhouts ............................... 349/180 |
| 5,490,003 | 2/1996 | Van Sprang . |

OTHER PUBLICATIONS

SID 96 Digest, XP000621070, Dec. 5, 1996, "High–Brightness Projection Displays Using Mixed–Mode Twisted–Nematic Liquid–Crystal Cells" S.–T. Wu, C.–S. Wu, pp. 763–766.

Molecular Crystals and Liquid Crystals Incorporating Nonlinear.

Optics 165, Dec. 1988, "The Twisted Nematic Effect: Liquid Crystal Materials", M. Schadt, pp. 405–437.

*Primary Examiner*—William L. Sikes
*Assistant Examiner*—James Dudek
*Attorney, Agent, or Firm*—Daniel P. Morris

[57] ABSTRACT

We invent a self-compensated twist nematic (SCTN) mode for reflective light valves with high optical efficiency nearly 100% and it has a saturation voltage below about 3 V and a relatively large tolerance in cell-gap non-uniformity compared to other prior arts. The invented SCTN mode is especially suitable for reflective light valves driven by active matrices fabricated on Si-wafers.

17 Claims, 5 Drawing Sheets

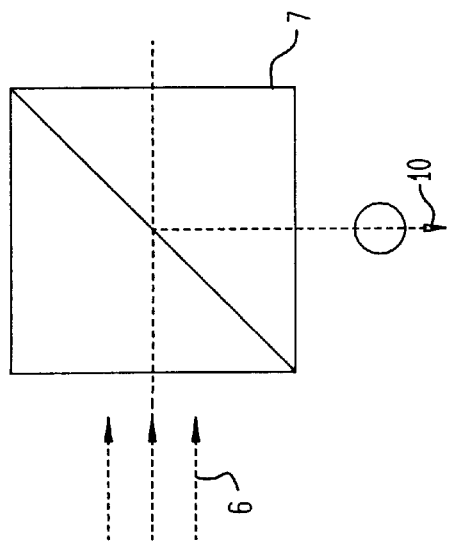
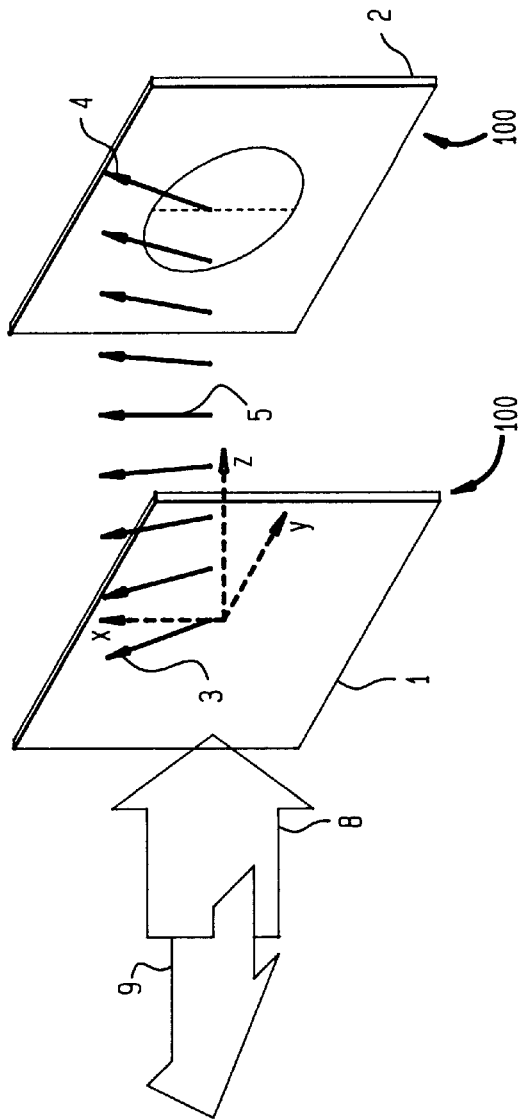

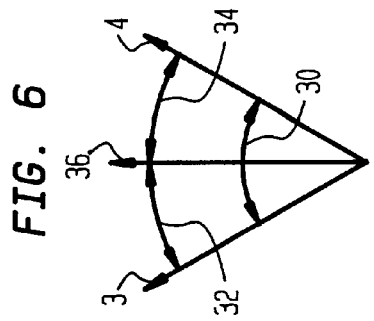
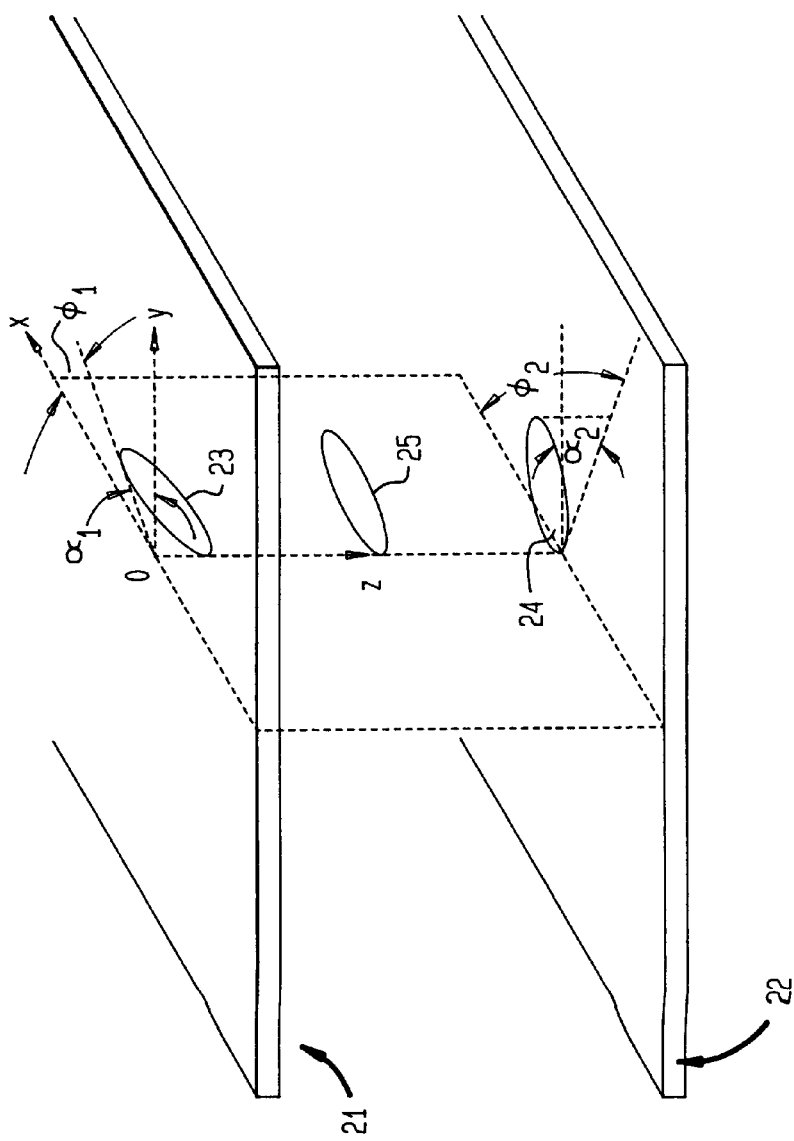

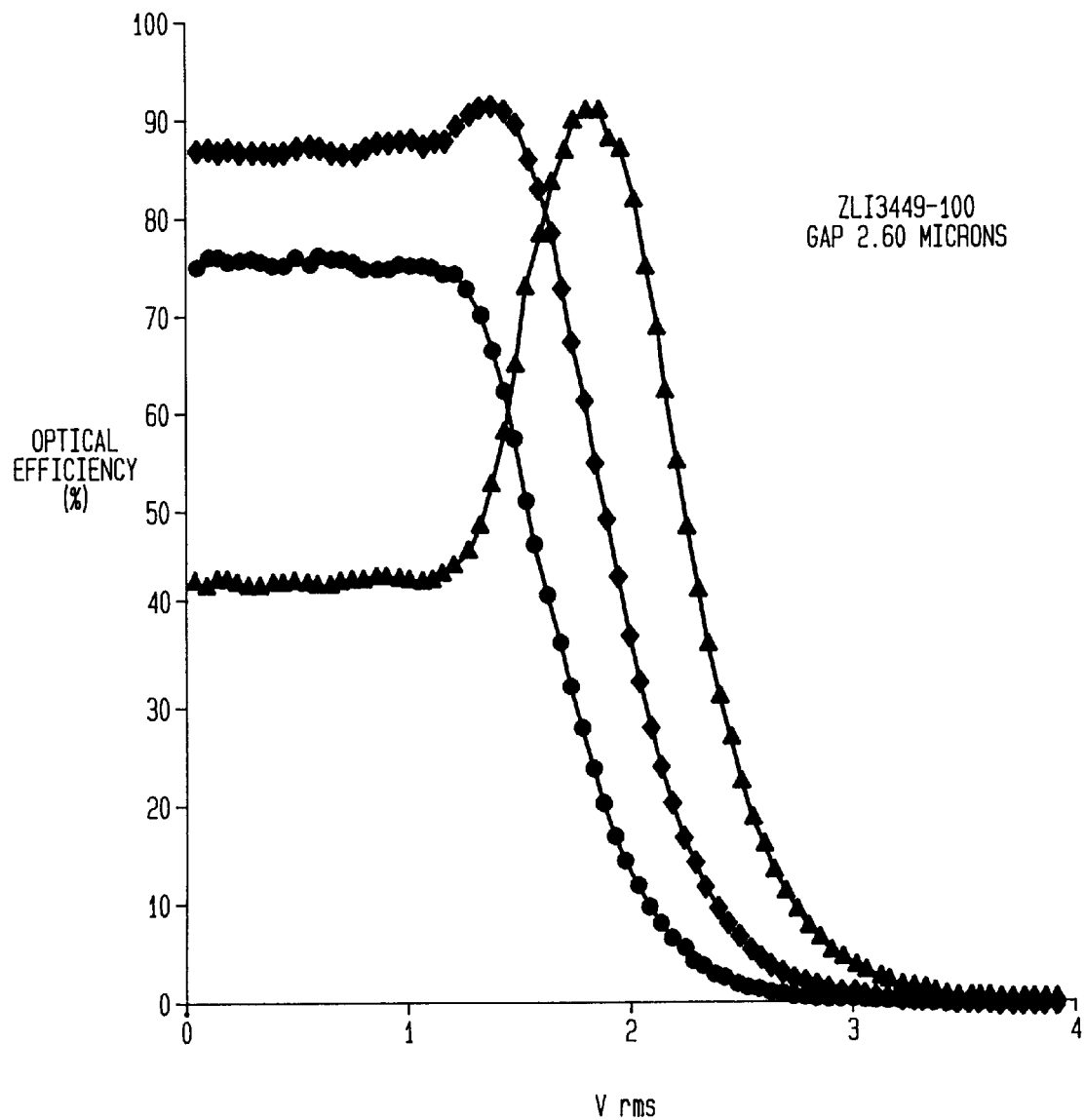

SELF-COMPENSATED TWISTED NEMATIC MODE FOR REFLECTIVE LIGHT VALVES

FIELD OF THE INVENTION

The present invention relates to a self-compensated twisted nematic liquid crystal (LC) cell for reflective light valves, and more particularly relates to a field-control nematic LC reflective display disposed behind a polarized beam splitter for projection displays.

BACKGROUND

Up to now, nematic LC devices being used in reflective light valves for projection displays require either a linearly-polarized or randomly-polarized incident light beam. The invention concerns only with the case where the incident light is linearly polarized. The commonly used LC modes which require incident light being linearly polarized for reflective light valves are electro-control birefringence (ECB) mode with tilted homogeneous alignment, the deformation of aligned phase (DAP), the hybrid-field-effect (HFE) mode, the 63.6°-twist mode[3], hybrid-aligned namtic (HAN) mode, and the mixed TN (MTN) mode. The operating principles of these LC modes for reflective light valves are illustrated in FIG. 1. An incident light beam 6 after passing through a polarizing beam splitter (PBS) 7 becomes a linearly-polarized light 8, defined as p-wave, and impinges on a nematic LC cell 100 which contains a front substrate 1, a rear substrate 2, a nematic LC medium 5 in between, and two LC alignment directions 3 and 4 on the substrates 1 and 2, respectively. There are two electrodes (not shown in FIG. 1), one being a transparent electrode behind the front substrate 1 facing the LC medium 5, and the other being a reflective metal electrode (not shown in FIG. 1) in front of the rear substrate 2 facing the LC medium. The nematic LC cell 100 shown in FIG. 1 (b) is designed in such a way that at or below a certain voltage defined as the threshold voltage applied to the two electrodes of the the LC cell 100, the incident polarized beam 8 will become the s-wave 9 (or nearly s-wave) upon reflection from the LC cell 100. The s-wave is a linearly polarized light whose direction of polarization being perpendicular to that of the p-wave. The s-wave 9 will be reflected 90° by the PBS 7 into the s-wave 10 to be collected by projection lenses (not shown in FIG. 1) onto a screen for viewing. This situation represents the bright state of the light valve. When an external voltage is applied across the two electrodes of the LC cell 100 such that at or above a certain voltage defined as the saturation voltage, the LC cell 100 will behave nearly as an optically isotropic medium. In this situation, the impinging linearly polarized light 8 will be reflected from the reflective LC cell 100 preserving the same direction of polarization, p-wave in this case. The reflected p-wave after passing through the PBS 7, will propagate backward opposite to the incident beam 6. The reflected p-wave has a negligible intensity being reflected 90° by the PBS 7 into the s-wave 10, representing the dark state of the light valve. When the applied voltage level is in between the threshold voltage and the saturation voltage, inter-mediate gray level will be activated to achieve display with many gray levels up to 1024 levels.

The prior art of nematic LC modes for reflective light valves which require the incident light being linearly polarized are shown schematically in FIG. 2, which consists mainly of a front substrate 21, a rear substrate 22, a nematic LC medium 25, an LC director 23 adjacent to the front substrate 21, and a LC director 24 adjacent to the rear substrate 22. A x,y,z coordinate system is also shown in FIG. 2 to correlate with the x,y,z coordinate system shown in FIG. 1. There are two parameters, $\alpha_1$ and $\phi_1$ to describe the orientation of the LC director 23. The $\alpha_1$ is the tilted angle of the LC director 23 from the plane of the front substrate 21, and $\phi_1$ is the azimuthal angle of the LC director 23 projected onto the front substrate 21 with respect to the x-axis. There are also two parameters, $\alpha_2$ and $\phi_2$ to describe the orientation of the LC director 24. The $\alpha_2$ is the tilted angle of the LC director 24 from the plane of the rear substrate 22, and $\phi_2$ is the azimuthal angle of the LC director 24 projected onto the rear substrate 22 with respect to the x-axis. By choosing a nematic mixture with either a positive or a negative dielectric anisotropy and a set of parameters for $\alpha_1$, $\phi_1$, $\alpha_2$, and $\phi_2$, we can describe or define the six combinations of the prior art.

When properly optimized for nearly monochromatic incident light, in principle, the ECB mode, the HAN mode, and and the 63.6°-twist mode have the same high optical efficiency of nearly 100% if anti-reflection films are coated on the window of the light valves. Here, we define optical efficiency as the conversion of the incident p-wave into reflected s-wave neglecting the loss due to indium-tin-oxide and the metal electrodes and the LC alignment layers in the light valves. However, all of the combinations except the ECB mode with tilted homogeneous alignment require rather high operating voltage, usually larger than 6 V. While the ECB mode with tilted homogeneous alignment can be operated at a lower voltage, it requires a stringent cell-gap uniformity. The MTN mode has a saturation voltage of about 4 V and a lower optical efficiency of 0.88 compared to other combinations for reflective light valves.

There are three important criteria for selecting the most suitable LC mode for reflective light valves. The first criterion is high optical efficiency. The second criterion is to have a large tolerance in cell-gap non-uniformity so that high yield can be achieved in manufacture. The third criterion is to have a low saturation voltage which is particularly important using active matrices on Si-wafer to drive the reflective light valves. The lower the saturation voltage is, the higher the display resolution can be achieved for a fixed area of Si-wafer. Using a LC mode with lower saturation voltage will result in lower cost in manufacture and low-power consumption. Law saturation voltage can be achieved using the ECB mode with tilted homogeneous alignment but its requirement on the cell-gap uniformity is too stringent. The MTN mode has a lower but not the lowest saturation voltage, and a large tolerance in cell-gap non-uniformity, but it has a poor optical efficiency of 0.88.

It is an object of the present invention to provide a self-compensated twisted nematic (SCTN) mode that has the advantages of low operating voltage, high optical efficiency, and a relatively large tolerance for cell-gap non-uniformity especially suitable for active-matrix-driven reflective light valves based on Si-wafers.

REFERENCES CITED

M. F. Shiekel and K. Fahrenschon, Appl. Phys. Lett. V.19, 391(1971); F. J. Kahn, Appl. Phys. Lett. V.20, 199(1972); R. A. Soref and M. J. Rafuse, J. Appl. Phys. V.43, 2029(1972).

W. P. Bleha, J. Grinberg, A. D. Jacobson, and G. D. Myer, SID77 DIGEST, p.104 (1977).

T. Sonehara and 0. Okumura, Japan Display 89, p.192 (1989).

J. Glueck, E. Lueder, T. Kallfass, and H. -U. Lauer, SID 92 DIGEST, p.277 (1992).

Shin-Tson Wu and Chiung-Sheng Wu, Appl. Phys. Lett. V.68, 11(1996).

SUMMARY

A broad aspect of the present invention is a self-compensated twisted nematic (SCTN) mode for reflective light valves. The advantages of this new mode are nearly 100% achievable optical efficiency, a saturation voltage below about 3 V, and a relatively large tolerance in cell-gap non-uniformity. The low saturation voltage is particularly useful for the active-matrix-driven reflective light valves based on Si-wafers for high resolution and low cost.

BRIEF DESCRIPTION OF THE DRAWINGS

FIG. 1 shows the operating principles using nematic liquid crystal cells for reflective light valves which require the incident light being linearly polarized. FIG. 1 (b) shows the schematic drawing for the present invention of self-compensated twisted nematic mode.

FIG. 2 shows a schematic drawing for prior art nematic liquid crystal cells.

FIG. 5 show the experimental results of the optical efficiency versus applied voltage for the present invention using ZLI3449-100 from E. Merck as the LC mixture. The circles, diamonds, and triangles are for the red, green, and blue incident lights, respectively.

FIG. 6 schematically shows the preferred orientation of the incident beam polarization with respect to the alignment directions according to the present invention.

DETAILED DESCRIPTION

Figure 3:
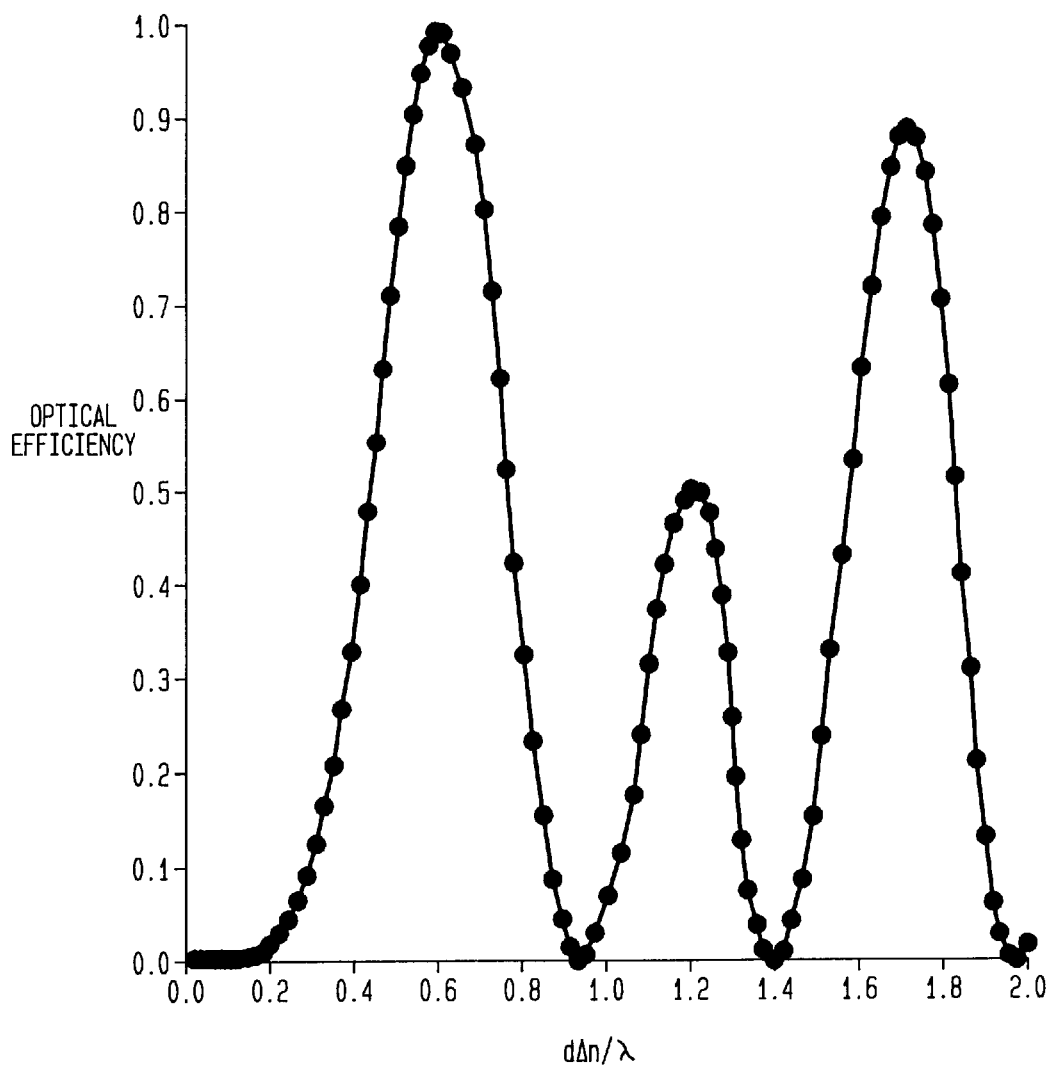
FIG. 3 shows the calculated results of the optical efficiency as a function of $d\Delta n/\lambda$ for the structure of the present invention.
Figure 4:
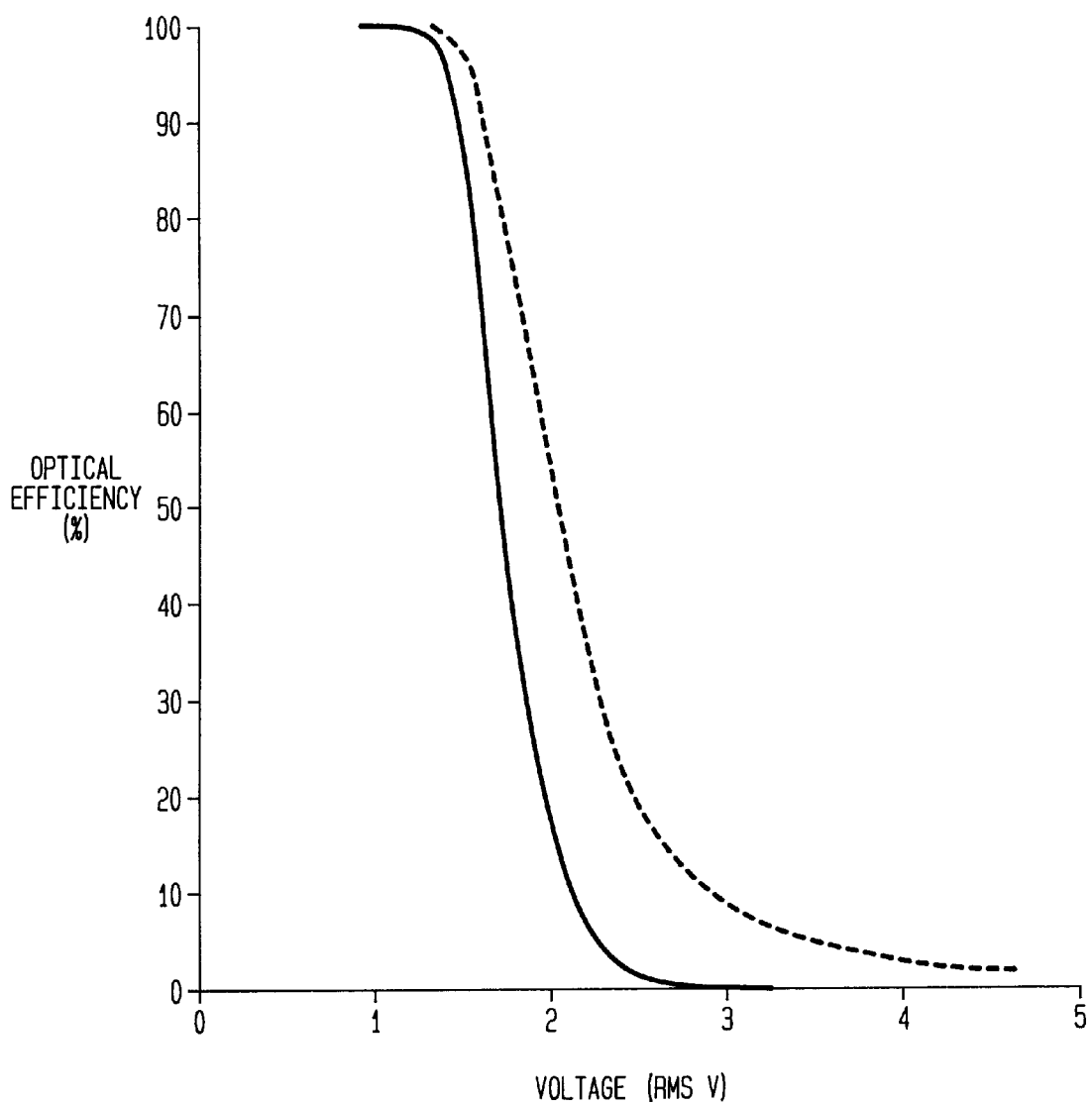
FIG. 4 shows the optical efficiency versus applied voltage in solid curve for the structure of the present invention. The dashed curve in FIG. 4 shows the corresponding result for a regular 60°-twist mode in accordance with the prior art.

The configuration of this invention concerning a self-compensated twist nematic (SCTN) mode is shown in FIG. 1 (b), where a twisted nematic cell 100 with twist angle from 60 to 65° is used. In this configuration, the polarization direction of the incident light 8 bisects the twist angle of the SCTN cell. In other words, the angle between the polarization direction of the incident beam 8 and the LC alignment direction 3 on the front substrate is about 30° which is approximately equal to the angle between the polarization direction of the incident beam 8 and the LC alignment direction 4 on the rear substrate. For the rest of this description, we use a total twist angle of 60° for the SCTN cell 100 shown in FIG. 1 (b) as an example. Using Jones matrix method, we can calculate the optical efficiency as a function of $d\Delta n/\lambda$ for the SCTN mode where d, $\Delta n$, and $\lambda$ are the cell gap, the birefringence of the LC medium, and the wavelength of the incident light, respectively. The result is shown in FIG. 3 where an optical efficiency of nearly 100% is achieved at $d\Delta n/\lambda=0.61$. We used this parameter for the simulation the optical efficiency versus applied voltage for the configuration shown in FIG. 1 where a polarizing beam splitter is utilized, and the front window of the light valve is coated with ideal anti-reflection films. FIG. 6. schematically shows the polarization 36 of the incident beam 8 relative to the two LC alignment directions 3 and 4. Angle 30 is from about 50° to about 70°. Angle 32 is about equal to angle 34 so that the polarization 36 of the incident beam substantially bisects the angle 30. The simulated result is shown in the solid curve of FIG. 3 for the SCTN mode and the dashed curve shows the corresponding result for a regular 60°-twist case with incident polarization being either parallel or perpendicular to the entrance LC director of the 60°-twist cell. For the simulations, we used the material parameters of MLC6012 from E. Merck. From FIG. 4, we see that the contrast ratio exceeds 270 to 1 at 3 V for the SCTN mode. For comparison, the contrast ratio of the regular 60°-twist mode is only about 50 to 1 at 4.5 V. In the SCTN mode, the reflection at 3 V is low because the polarization direction of the incident light bisects the angle formed between two boundary LC directors adjacent to the front and the rear substrates so that mutual compensation occurs between these two boundary LC layers. In the regular 60°-twist case, the reflection at 3 V is still high because such mutual-compensation effect does not occur between these two boundary LC layers.

We have obtained experimental results using the SCTN mode of the present invention. We used ZLI3449-100 from E. Merck as the LC mixture. The measured optical efficiency versus applied voltage using the configuration shown in FIG. 1 for red, green, and blue wavelengths are shown in FIG. 5 as circles, diamonds, and triangles, respectively. For these measurements, we do not have anti-reflection coating on the window of the SCTN cell so that the maximum optical efficiency is only about 92%. The experimental results show that we can achieve high contrast ratio at an applied voltage of 3.6 V. For the regular 60°-twist mode, high contrast ratio can only be obtained at an applied voltage larger than 8 V. The saturation voltage of the SCTN mode can be lower than 3 V if LC mixtures with larger dielectric anisotropy and high charge retention such as MLC6012 were used.

What is claimed is:

1. A structure comprising a reflective mode twisted nematic liquid crystal cell which in the cell's energized state has a total twist angle from 50 to 75° and a $d\Delta n/\lambda$ from 0.4 to 0.8, and a means for providing an incident beam having a polarization direction which substantially bisects or which is substantially perpendicular to the bisector of said total twist angle.

2. A structure according to claim 1, wherein said twisted nematic LC cell has at least one transparent electrode and at most one reflective electrode.

3. A structure according to claim 1, wherein said twisted nematic LC cell uses LC mixtures disposed between oppositely disposed substrates with negative dielectric anisotropy and tilted homogeneous alignments with pretilt angles less than about 25° from said oppositely disposed substrates.

4. A structure according to claim 3, wherein said LC mixtures contains a chiral agent so as to induce a twist angle less than about 80° for said LC cell.

5. A structure according to claim 1 further including a means for applying a voltage to said nematic liquid crystal cell to piece said cells into its energized state.

6. A structure according to claim 2, wherein reflective electrode is a metal electrode.

7. A structure according to claim 1, wherein said nematic LC cell contains LC mixtures disposed between oppositely disposed substrates with negative dielectric anisotropy and tilted homeotropic alignments with pretilt angles greater than about 75° from said substrates.

8. A structure according to claim 5, wherein said LC mixtures contains a small concentration of chiral agent so as to induce a twist angle less than about 80° for said LC cell when said voltage exceeds a threshold voltage and to induce almost a zero twist angle when said voltage is less than said threshold voltage.

9. A structure comprising a reflective mode twisted nematic liquid crystal cell with an LC mixture with negative dielectric anisotrophy and a dΔn/λ from 0.4 to 0.8 disposed between oppositely disposed substrates with pretilt angles of the liquid crystal in the unenergized state greater than about 75° from said substrates to provide minimum retardation between crossed polarizers in the unenergized state and a total twist angle from 50 to 75° in the energized state to provide greatest retardation in its eneryized state, and a means for providing an incident beam having a polarization direction which substantially bisects said total twist angle.

10. A structure according to claim 9, wherein said twisted nematic LC cell has at least one transparent electrode and one reflective electrode.

11. A structure according to claim 9 where dΔn/λ is substantially 61.

12. A structure according to claim 9, wherein said LC mixture consists of one of 2L13449-100 and MLC 6012 of EMerck.

13. A structure according to claim 9, wherein the total twist angle is from about 50 to 70°.

14. A structure according to claim 13, wherein the total twist angle is about 60°.

15. A structure according to claim 9, including a means for applying a voltage to said nematic liquid crystal cell to place the cell in its energized state.

16. A structure according to claim 10, wherein reflective electrode is a metal electrode.

17. A structure according to claim 9, wherein said means providing an incident beam includes crossed polarizers providing minimum retardation in its unenergized state.

* * * * *